(12) United States Patent
Helms

(10) Patent No.: US 9,908,378 B1
(45) Date of Patent: Mar. 6, 2018

(54) TRAILER ANTI-THEFT LOCKING POST

(71) Applicant: Roger K Helms, Fayetteville, TN (US)

(72) Inventor: Roger K Helms, Fayetteville, TN (US)

( * ) Notice: Subject to any disclaimer, the term of this patent is extended or adjusted under 35 U.S.C. 154(b) by 0 days.

(21) Appl. No.: 15/656,522

(22) Filed: Jul. 21, 2017

Related U.S. Application Data

(60) Provisional application No. 62/600,138, filed on Feb. 15, 2017.

(51) Int. Cl.
*B60D 1/60* (2006.01)

(52) U.S. Cl.
CPC ..................................... *B60D 1/60* (2013.01)

(58) Field of Classification Search
CPC ........................................................ B60D 1/60
USPC ......................................................... 280/507
See application file for complete search history.

(56) References Cited

U.S. PATENT DOCUMENTS

| | | | | |
|---|---|---|---|---|
| 2,931,463 A * | 4/1960 | Stansbury | ................ | B60D 1/66 188/32 |
| 3,226,133 A | 12/1965 | Geresy | | |
| 3,857,575 A * | 12/1974 | Lee | ........... | B60D 1/66 248/351 |
| 4,373,303 A * | 2/1983 | Stratichuk | ............... | B60D 1/66 52/165 |
| 5,094,423 A * | 3/1992 | Almquist | ................. | B60D 1/60 248/156 |
| 5,513,871 A | 5/1996 | Johnson | | |
| 6,155,587 A * | 12/2000 | Milazzo | ................... | B60D 1/06 280/457 |
| 6,598,432 B1 | 7/2003 | Dwyer | | |
| 9,296,269 B1 * | 3/2016 | Riibe | ........................ | B60D 1/06 |
| 2007/0257470 A1 * | 11/2007 | Konsela | ................... | B60D 1/02 280/504 |
| 2009/0322060 A1 * | 12/2009 | Macdougall | ........... | B60D 1/145 280/491.3 |
| 2014/0084568 A1 * | 3/2014 | Lahn | ........................ | B60D 1/06 280/506 |
| 2014/0183840 A1 * | 7/2014 | DeLisio | ................... | B60D 1/52 280/416.1 |

* cited by examiner

*Primary Examiner* — Jacob D Knutson
(74) *Attorney, Agent, or Firm* — Cynthia R. Wright

(57) ABSTRACT

The Trailer Anti-Theft Locking Post is a device that is used to lock a trailer or other hitched device so that the trailer cannot be moved. The device may be anchored into concrete or secured unto the ground. A post reversible extends upward providing a means to lock a trailer or hitched device. When a user desires to move the trailer, the trailer is unlocked, and the post is reversibly retracted beneath the ground level, which puts the device out of sight and out of the way.

10 Claims, 9 Drawing Sheets

TRAILER ANTI-THEFT LOCKING POST

CROSS-REFERENCE TO RELATED APPLICATIONS

This application does not claim the benefit of priority to any other application or patent.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM

Not applicable.

STATEMENT REGARDING PRIOR DISCLOSURES BY THE INVENTOR OR JOINT INVENTOR

The inventor did not disclose the invention herein prior to the 12 month period preceding the filing of this provisional application.

BACKGROUND OF THE INVENTION (1) Field of the Invention.

The invention relates generally to a mechanical device that secures a hitched device, including a trailer or other device that includes a hitch. This device can be paired with any hitch, including a ball, a pintle, a combination ball and pintle hitch, or a lunette ring. Following proper installation, the device secures a trailer or other hitched device so that it cannot be freed from said device.

(2) Description of Related Art.

Items that include a hitch come in all shapes and sizes. For example, travel trailers that travelers like to sleep and vacation in include a hitch to attach said travel trailer to a truck for towing. Additionally, flat trailers that are hitched to a moving vehicle are utilized to carry or haul furniture for moving or building supplies for building a deck. Certain equipment, such as a generator or a welder, are permanently attached to a trailer so that they can be conveniently moved from one area to another. Each of these trailers, as well as others, include a hitch mechanism to attach them to a vehicle for towing to another location. Ball-shaped hitches and pintle hitches are commonly employed as a hitch mechanism. A ball hitch comprises a device with a ball on the end that is attached to the chassis of a vehicle for towing. It can take the form of a tow ball to allow swiveling and articulation of a trailer. The ball hitch may be a tow hook with a trailer loop, which is often used for large or agricultural vehicles where slack in the pivot pin allows similar movements. Additionally, some vehicles and devices utilize a pintle and lunette device that work in combination with a pintle hook on the tow vehicle and a lunette ring on the trailer being towed.

When a hitched device, such as a travel trailer, other trailer or trailer-mounted device, is not being used there is currently no economically feasible way to secure the trailer from theft or from undesired movement. If there is not sufficient room to park the trailer in a garage bay, then the trailer must be stored outside. A trailer stored outside may be quickly stolen by anyone passing by that has the proper hitch installed on their vehicle. Also, a trailer not secured may roll along variations in the slope of the land causing damage to the trailer or property positioned beneath it.

A device is needed that can safely and securely secure a hitched device when said device is not in use.

DETAILED DESCRIPTION OF THE INVENTION

Figure 1:
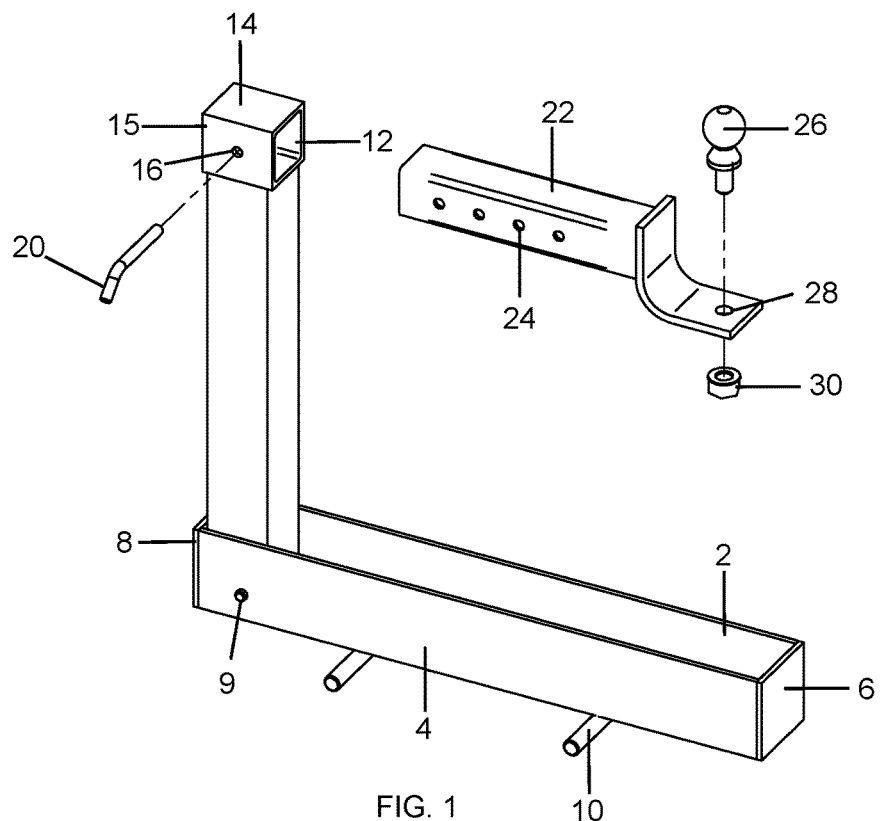
FIG. 1 depicts an angled side view of the device with the ball hitch (ball, ball lock, receiver, and receiver pin) in an exploded view.

While this invention is susceptible of embodiment in many different forms, there are shown in the drawings and will herein be described in detail, several embodiments with the understanding that the present disclosure should be considered as an exemplification of the principles of the invention and is not intended to limit the invention to the embodiments so illustrated. Further, to the extent that any numerical values or other specifics of materials, et., are provided herein, they are to be construed as exemplifications of the inventions herein, and the inventions are not to be considered as limited thereto.

The following description and drawings are illustrative and are not to be construed as limiting. Numerous specific details are described to provide a thorough understanding of the disclosure. However, in certain instances, well-known or conventional details are not described in order to avoid obscuring the description. References to one, or an, embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a ter; the scope and meaning of a term is the same, in the same context, whether or not it is highlighted. It will be appreciated that the same thing can be said in more than one way.

Consequently, alternative language and synonyms may be used for any one or more of the terms discussed herein, or is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the disclosure or of any exemplified ter. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

Embodiments of the present invention may include one or more of the following features.

FIG. 1 depicts an angled, side view of the Trailer Anti-Theft Locking Post with an exploded view of the hitch device. In this embodiment, the hitch device comprises receiver 22 with one or more receiver opening(s) 24, locking pin 20, and ball 26 that fits through ball opening 28 and locks into position via lock 30. Receiver 22 may be composed of steel, stainless steel, titanium, iron or any other suitable material that is strong, durable and resistant to changes in environmental conditions, as extreme heat, rain, and ice. Receiver 22 may be commercially available at automotive supply stories. Receiver 22 may be reversibly inserted through locking post receiver acceptor opening 12. Receiver 22 includes one or more receiver openings 24 wherein said receiver opening 24 is capable of receiving locking pin 20. Although four receiver openings 24 are shown on FIG. 1, each receiver opening 24 has a second receiver opening 24 opposite it on the opposite side of receiver 22. Locking pin 20 is composes of steel, stainless steel, titanium, or any suitable material that is strong, durable, and resistant to environmental conditions, such as extreme heat, rain, and ice. Locking pin 20 is inserted through receiver opening 24 to lock the hitch device into the Trailer Anti-Theft Locking Post. Locking pin 20 must include either a locking mechanism or an opening to receive a lock in order to lock it into position when inserted through receiver opening 24.

Ball 26 may be welded onto receiver 22 or may be locked onto receiver 22 via lock 30. In this embodiment ball 26 is inserted into receiver 22 through ball opening 28. Lock 30 is secured onto ball 26 so that ball 26 may not be removed from receiver 22.

The Trailer Anti-Theft Locking Post may be comprised of both a fixed base and rotatable post. The fixed post may be comprised of the following: horizontal cradle channel 4, channel front plate 6, channel end plate 8, and supports 10. Horizontal cradle channel 4, channel front plate 6, and channel end plate 8 may be composed of steel, stainless steel, iron or any durable metal of suitable strength. Horizontal cradle 4 includes two side panels and a flat base, which together create channel space 2. Supports 10 may be rebar (as shown) or any material that is suitable to anchor the device into concrete (shown in FIGS. 7 & 8). Supports 10 may be welded onto or permanently attached to horizontal cradle channel 4. Horizontal cradle channel 4 must of sufficient width, depth, and length so that channel space 2 is able to accept the post member. Channel front plate 6 and channel rear plate 8 cap the ends of horizontal cradle channel 4 preventing soil, cement, and debris from entering horizontal cradle channel 4 ensuring that there is adequate space within said horizontal cradle channel to accept the rotatable post. Channel front plate 6 and channel rear plate 8 may be welded onto horizontal cradle channel 4 so that they remain fixed into position preventing the flow and movement of dirt and debris into horizontal cradle channel 4. Horizontal cradle channel 4 includes cradle pin 9, which is inserted through horizontal cradle channel 4 and locked or welded onto horizontal cradle channel 4 locking the post member into the fixed base.

The rotatable post may comprise: post 18 and locking post receiver acceptor 14. Locking post receiver acceptor 14 is welded or permanently attached to post 18. Locking post receiver acceptor 14 includes locking post receiver opening 12 that is of sufficient size and dimension to allow receiver 22 to be reversibly inserted therein. Locking post receiver 14 includes two side panels 15 wherein each side panel 15 includes a locking pin opening 16. Locking pin openings 16 are aligned opposite each other so that locking pin 20 may be inserted reversibly to lock receiver 22 into the Trailer Anti-Theft Locking Post device. Post 18 includes two openings (shown in FIG. 9)—each opening is positioned directly below each locking pin opening 16. Cradle pin 9 is irreversibly inserted through horizontal cradle channel 4 and post 18, permanently anchoring post 18 into the fixed base. The rotating post may be composed of steel, stainless steel, iron, or any suitable material of sufficient strength and durability that can withstand extreme force, pressure and environmental conditions of extreme heat, rain, and ice.

Figure 2:
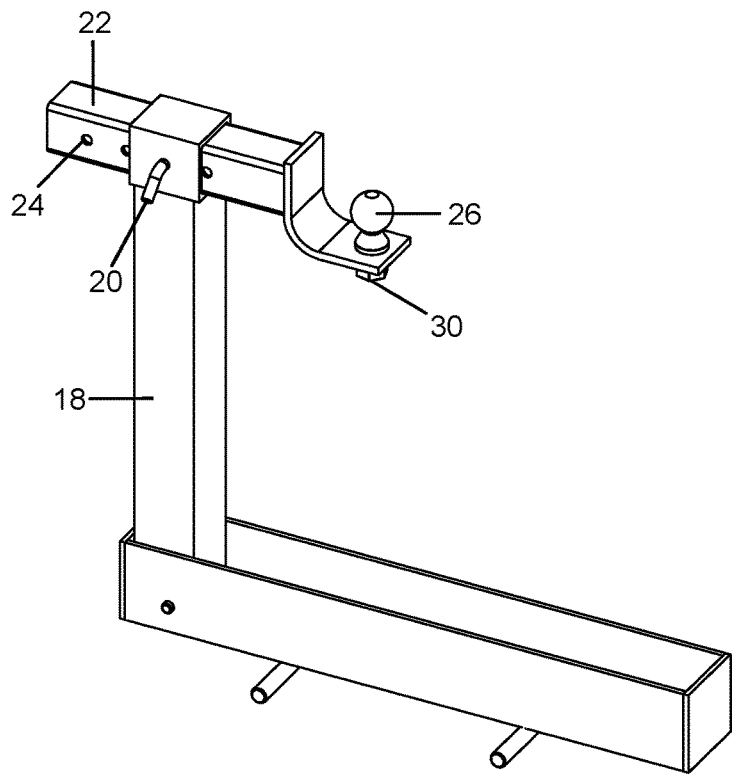
FIG. 2 depicts an angled side view of the device with a ball hitch securely attached thereon.

FIG. 2 depicts an angled, side view of the device with a ball hitch securely attached thereon. Post 18 is in a locked position and is ninety degrees from horizontal. Receiver 22 is positioned within post receiver opening 12 with locking pin 20 securing receiver 22 into a fixed position. Locking pin 20 is inserted through locking pin opening 16 (shown in FIGS. 1 and 9) and the locking pin opening 16 opposite it (not shown). Locking pin 20 may be inserted into any one set of receiver openings 24 so that it traverses through both receiver 24 and locking post receiver acceptor 14. The Trailer Anti-Theft Locking Post may now have a trailer, travel trailer, or other device locked onto ball 26, which is locked onto receiver 22 via lock 30.

Figure 3:
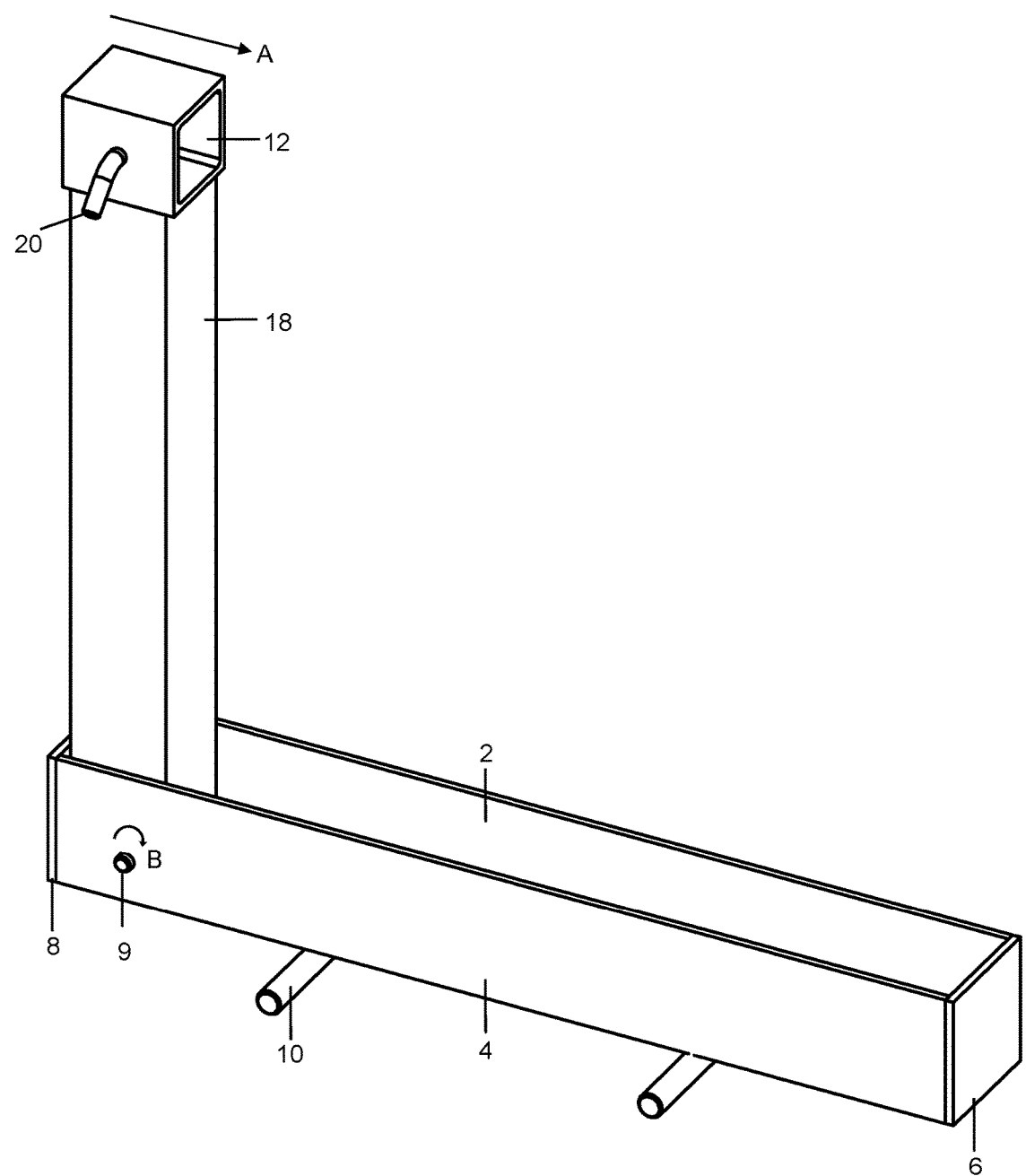
FIG. 3 illustrates an angled side view of the device in an upright, locked position.

The Trailer Anti-Theft Locking Post is depicted in the following positions: upright, moving, and closed in FIGS. 3, 4, and 5, respectively. FIG. 3 illustrates post 18 positioned ninety degrees from horizontal. Post 18 is capable of being moved in direction A via cradle pin 9, which allows rotation in direction B. Locking pin 20 is position within locking pin opening 16, traversing post receiver opening 12. Horizontal cradle channel 4 includes cradle space 2 that can receive post 18. Front cradle plate 6 and rear cradle plate 8 protect cradle space 2 from debris. Anchors 10 are shown as rebar.

Figure 4:
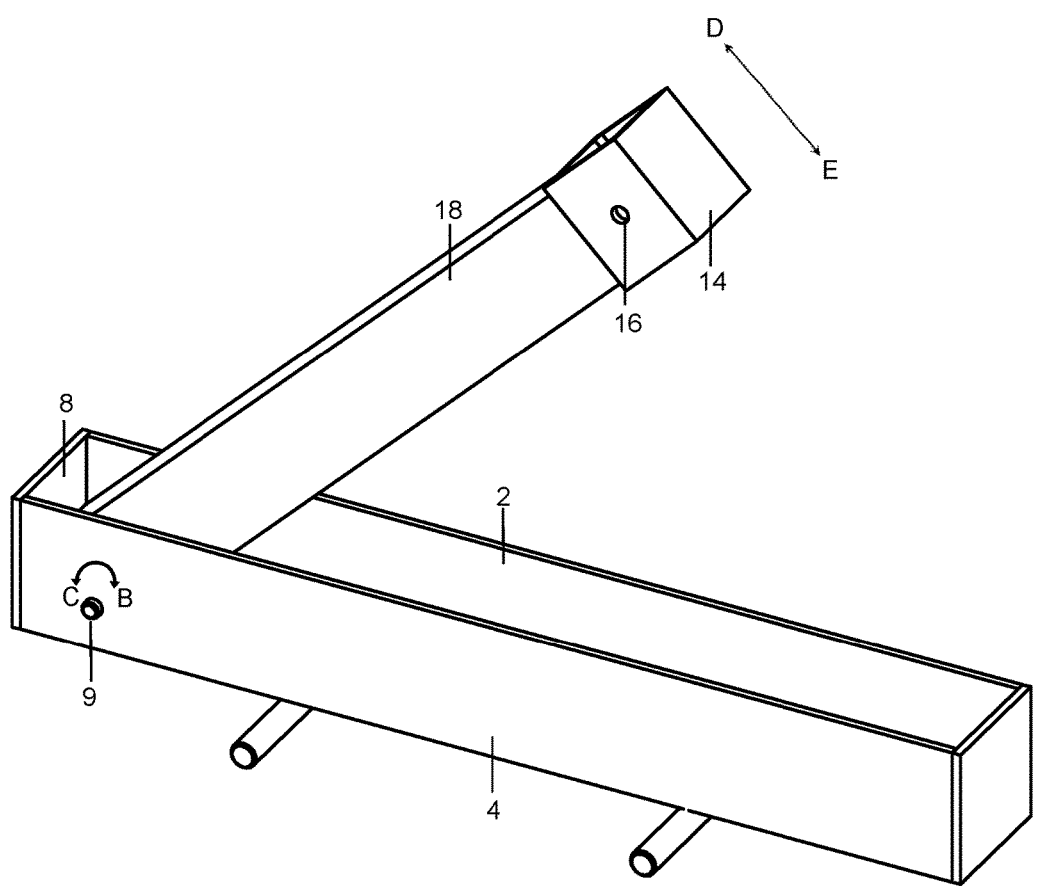
FIG. 4 illustrates an angled, side view of the device while the device is moving to a closed position.

FIG. 4 shows the device while it is moving during the closing process. During the closing process, post 18 can move in either direction D or E via rotation of locking pin 9. Pin 9 is free to move in either direction B or direction C when a trailer is not secured onto the device. The side wall of rear cradle plate 8 can be seen as post 18 moves towards horizontal cradle channel 4 and into cradle space 2. Locking pin opening 16 is free of locking pin 20 (shown inserted in FIG. 2). Post receiver acceptor 14 moves closer to front cradle plate 6 during the closing process.

Figure 5:
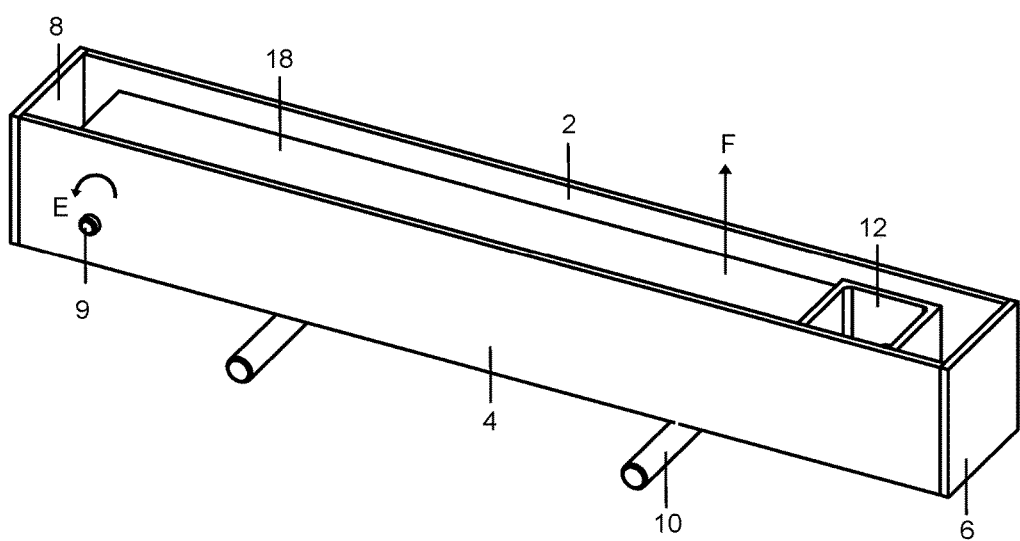
FIG. 5 depicts a side view of the device in a fully closed position.

FIG. 5 illustrates the device in a closed position. Post 18 is fully contained within cradle space 2. Post 18 is parallel to horizontal cradle channel 4. Post 18 may be repositioned by a user placing a finger or instrument into locking post receiver acceptor opening 12 and pulling post 18 in direction F via rotation of post 18 at cradle pin 9, which is free to rotate in direction C only. Rear cradle plate 8 is visible to a user.

Figure 6:
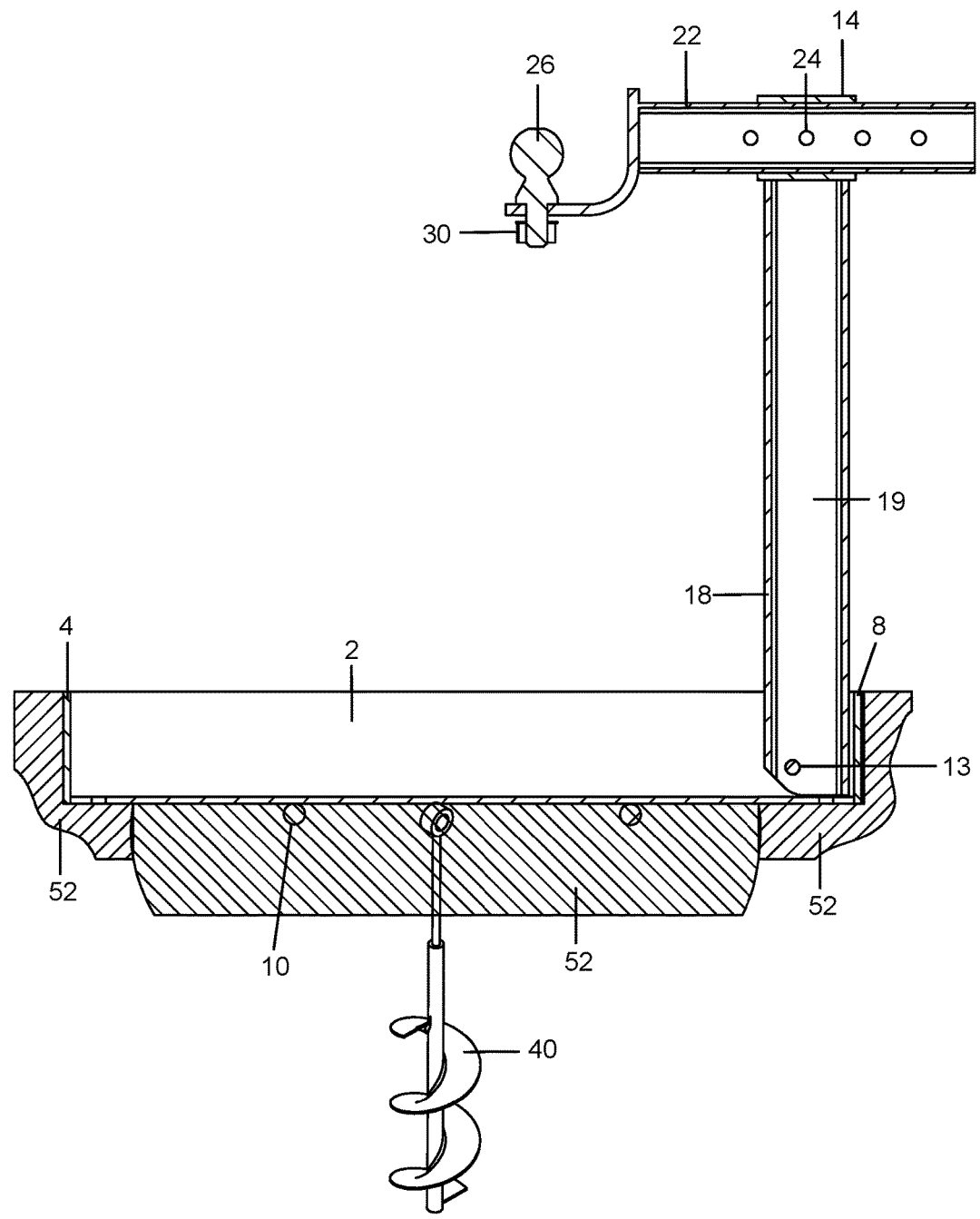
FIG. 6 depicts a mid-sectional view of the device in a locked position with a ball hitch attached and an auger employed to secure the device.

A mid-sectional view of the device in a locked position is shown in FIG. 6. Optional auger 40 is shown. Auger 40 may be used to firmly plant the device into ground or dirt 52. Once auger 40 is firmly planted into ground 52 horizontally, the device may be attached to auger 40 via horizontal cradle channel 4. Supports 10 are shown positioned within ground 52. Horizontal cradle channel 4 may include cradle space 2, which is void of post 18. Post 18 may be hollow steel with cavity 19. Two post cradle pin openings 13 are positioned opposite each other on post 18. The two post cradle pin openings 13 are utilized to secure post 18 onto horizontal cradle channel 4 via cradle pin 9 (shown in FIG. 1). Receiver 22 may be hollow steel of approximate two inches square and include one or more pairs of receiver openings 24. Receiver 22, which may be two and one-quarter inches square, is inserted into locking post receiver acceptor 14. Ball 26 is locked onto receiver 22 via ball lock 30.

Figure 7:
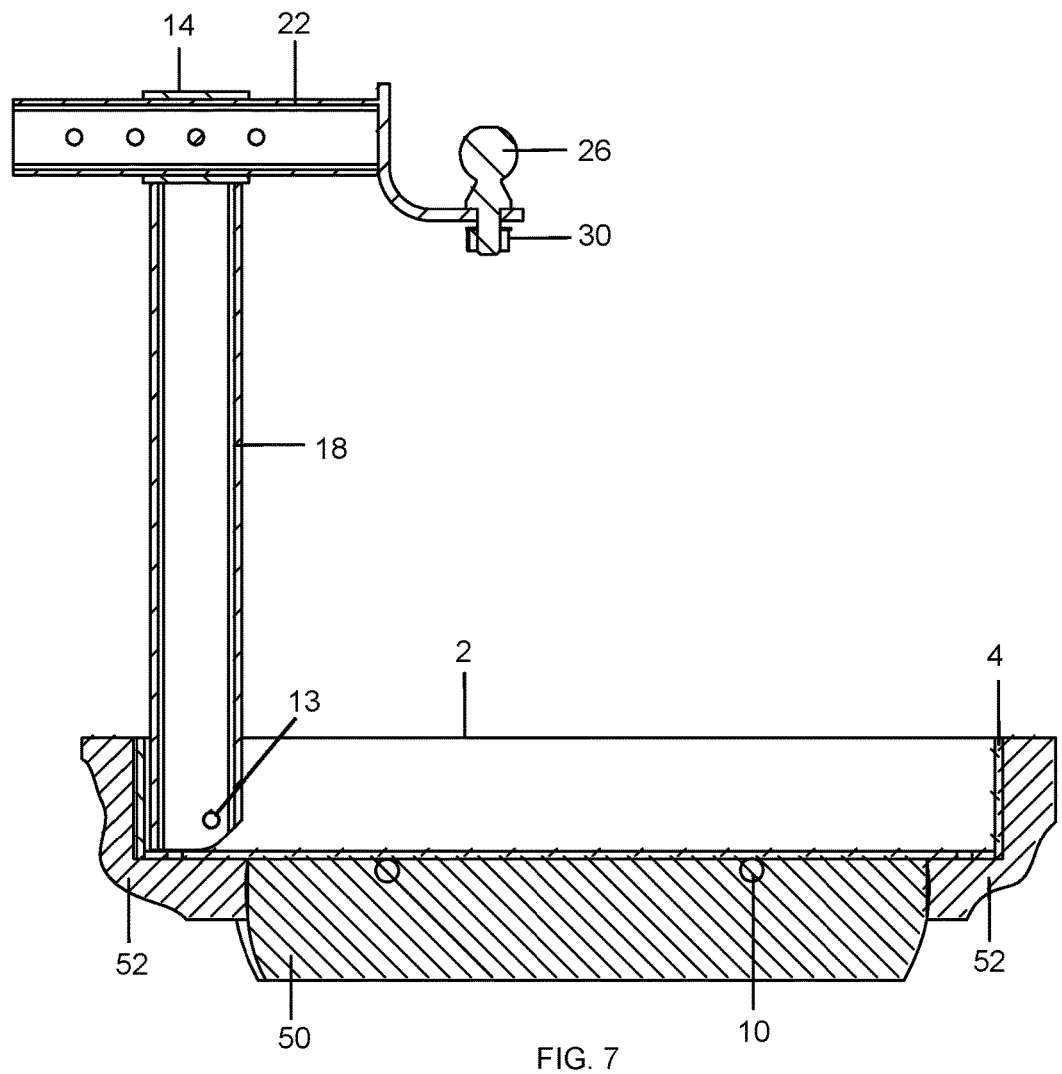
FIG. 7 depicts a mid-sectional view of the installed device with a ball hitch attached.
Figure 8:
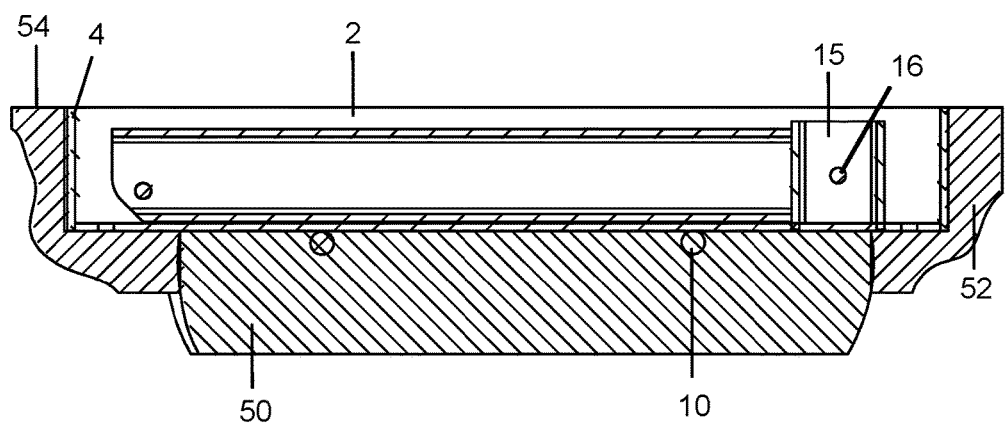
FIG. 8 illustrates a mid-sectional view of the installed device with the device in a closed position.

A mid-sectional view of the device cemented into the ground via concrete 50 is shown in FIGS. 7 and 8. FIG. 7 depicts a mid-sectional view of the device in a locked position, while FIG. 8 depicts the device in a closed position. Both figures show the device with anchors 10 firmly cemented into concrete 50, with ground or dirt 52 surrounding concrete 50. Concrete surrounds horizontal cradle channel 4. The amount of concrete necessary is that amount required to firmly and permanently position the device into a horizontal position that can secure the weight of the trailer sought to be secured. FIG. 7 depicts receiver 22, including ball 26 and lock 30, positioned into locking post receiver acceptor 14. Post 18 is ninety degrees from horizontal, and cradle space 2 is void of post 18. Post cradle pin opening 13 is seen without cradle pin 9 (shown in FIG. 1). FIG. 8 depicts post 18 fully contained within cradle space 2 such that post 18 is positioned below the surface 54 of ground 52. This positioning allows a user to drive over the device when it is closed, which permits the device to be installed in any convenient location, such as at the end of a driveway or parking deck. And, this hides the device from the view of neighbors or passersby. Panel 15 of locking post receiver acceptor 14 is shown with locking pin opening 16 void of pin 20.

Figure 9:
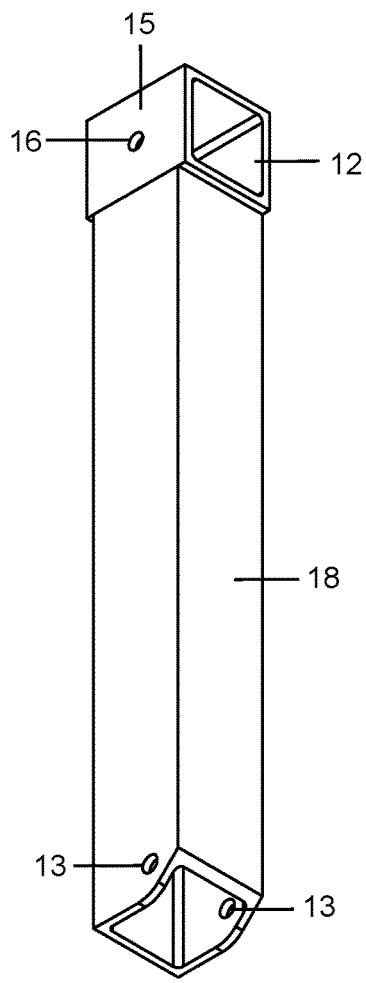
FIG. 9 illustrates an angled side view of the post member of the device.
Figure 10:
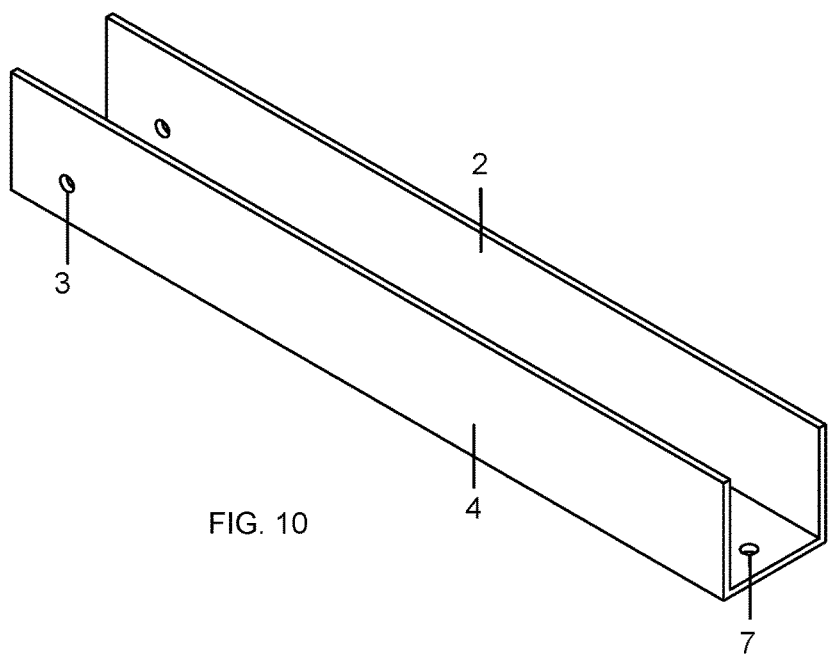
FIG. 10 depicts an angled side view of the channel member of the device.

FIG. 9 shows the rotatable post including post 18, locking post receiver acceptor opening 12, panel 15, and both post cradle pin openings 13. FIG. 10 depicts the fixed base member including horizontal cradle channel 4, cradle space 2, cradle pin openings 3, and horizontal cradle channel drain opening 7, which may be used to drain water that accumulates within cradle space 2. Two or more horizontal cradle channel drain openings 7 may be necessary to drain water and other precipitation from cradle space 2. For example, a single horizontal cradle channel drain opening 7 may be positioned on each end of the bottom length of horizontal cradle channel 4 so that water and precipitation will drain even if the device is not completely level.

Figure 11:
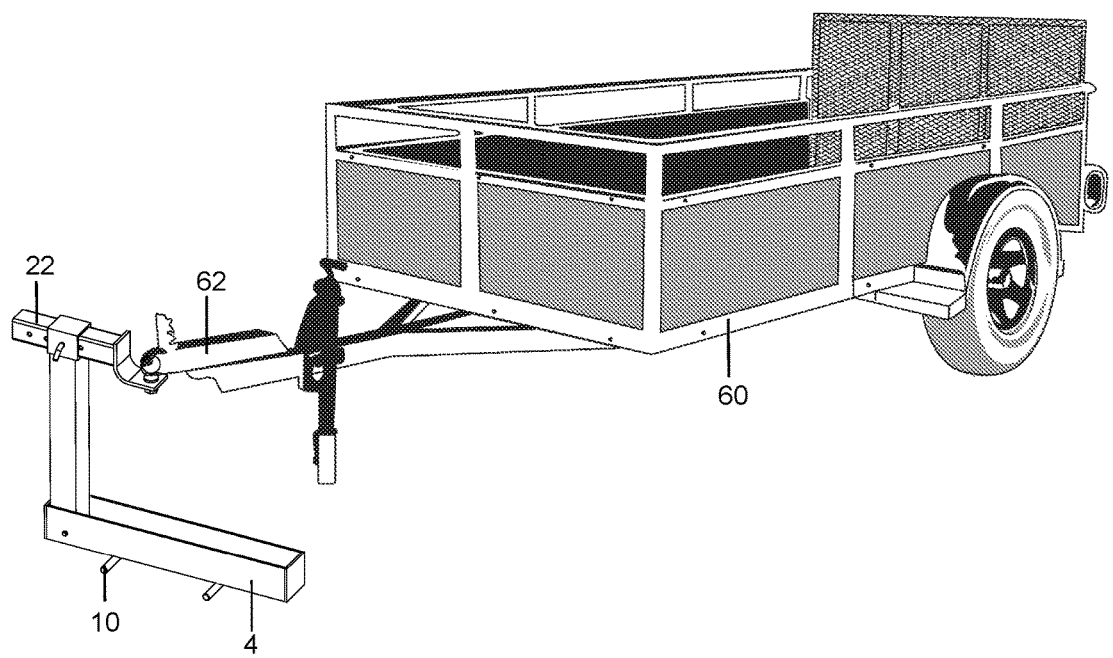
FIG. 11 depicts the device securing a trailer.

FIG. 11 illustrates the device securing a standard trailer. Horizontal cradle channel 4 is anchored via anchors 10. Trailer 60 includes gooseneck hitch 62 that is locked onto receiver 22. Trailer 60 is now securely locked into place and cannot be moved, removed, or stolen from the Trailer Anti-Theft Locking Post.

Figure 12:
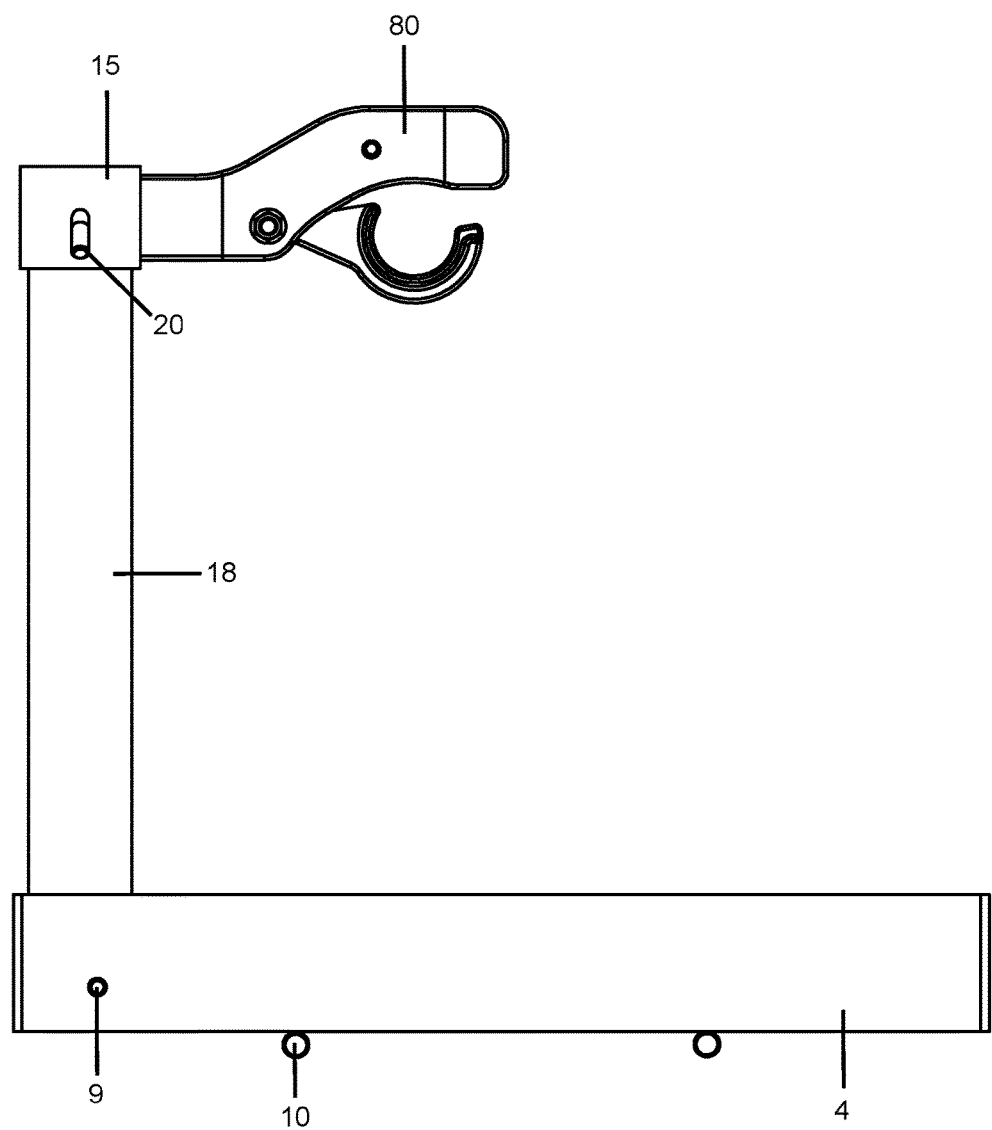
FIG. 12 illustrates a side view of the the pintle hitch embodiment of the device.

A side view of the pintle hitch embodiment is shown in FIG. 12. Pintle hitch 80 is secured onto post 18 via locking pin 20 that is positioned through side panel 15. Post 18 is positioned ninety degrees from horizontal cradle channel 4 via cradle pin 9. Anchors 10 are shown as rebar.

I hereby claim:

1. An apparatus for securing a device through a hitch positioned within said device comprising:
    a post member that is reversibly oriented from a horizontal position to an upright position;
    a locking member irreversibly coupled to said post member, wherein said locking member reversibly secures said device by being reversibly coupled to said hitch;
    a channel member that houses said post member when said post member is in the horizontal position; wherein said channel member is positioned at or below horizontal so that said post member is positioned below the surface of the surrounding area when said post member is positioned horizontal to said channel member;
    a pin member that permanently couples said post member to said channel member, wherein said pin member allows said post member to reversibly rotate from the horizontal position to the upright position; and
    wherein anchors are irreversibly attached to said apparatus so that said apparatus is embedded in concrete.

2. The apparatus of claim 1, wherein said channel member includes one or more openings that allow precipitation to drain from said channel.

3. The apparatus of claim 1, wherein an auger secures the apparatus into the ground.

4. The apparatus of claim 1, wherein the device secured is a travel trailer.

5. The apparatus of claim 1, wherein the device secured is a utility trailer.

6. The apparatus of claim 1, wherein the device secured is a utility trailer coupled to a welder.

7. The device of claim 1, wherein the hitch is a ball hitch.

8. The device of claim 1, wherein the hitch is a pintle hitch.

9. The device of claim 1, wherein the hitch is a pintle and ball combination hitch.

10. The apparatus of claim 1 composed of steel, stainless steel, titanium, or iron.

* * * * *